July 15, 1924.
G. STEINGRUBER
1,501,821
INTERCHANGEABLE DEMOUNTABLE RIM
Filed March 24, 1922
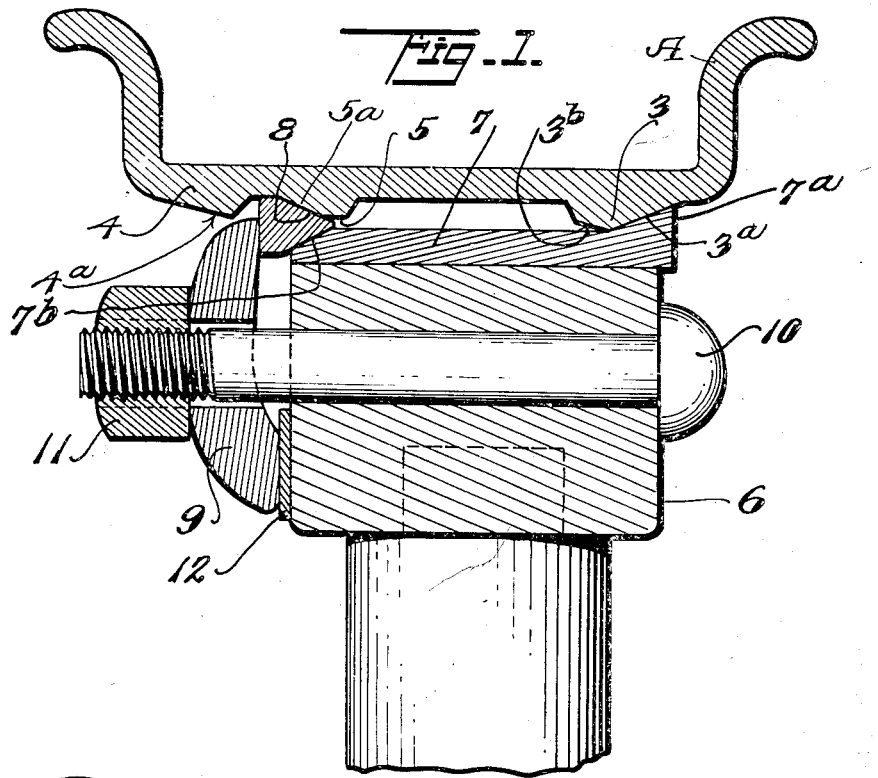
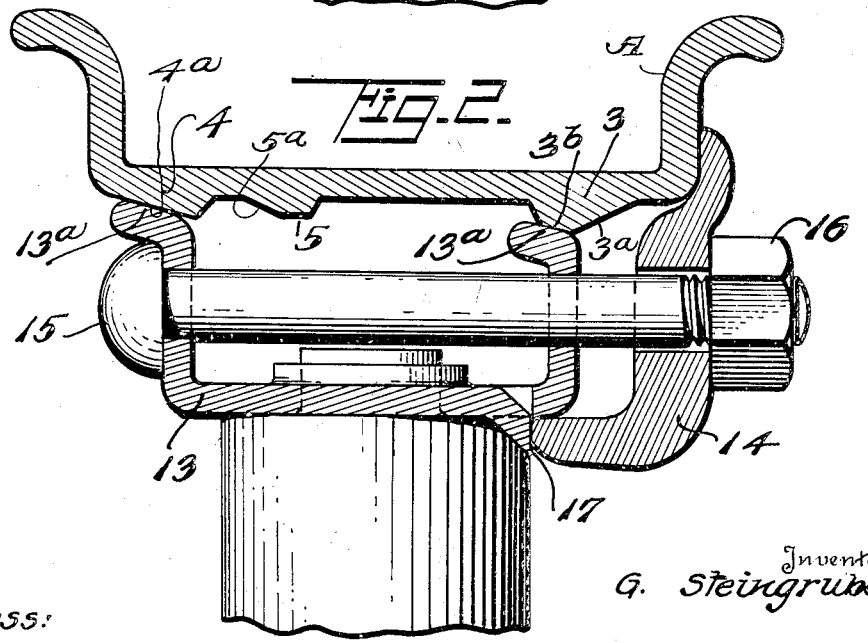
Witness:
E.H.Wagner
Inventor
G. Steingruber
By Robb, Robb & Hill
Attorneys Patented July 15, 1924.

1,501,821

UNITED STATES PATENT OFFICE.

GEORGE STEINGRUBER, OF ATLANTA, GEORGIA.

INTERCHANGEABLE DEMOUNTABLE RIM.

Application filed March 24, 1922. Serial No. 546,479.

*To all whom it may concern:*

Be it known that I, GEORGE STEINGRUBER, a citizen of the United States, residing at Atlanta, in the county of Fulton and State of Georgia, have invented certain new and useful Improvements in Interchangeable Demountable Rims, of which the following is a specification.

The present invention relates to a demountable rim which embodies novel features of construction whereby it can be used interchangeably upon a number of different types of felly constructions or fittings, thereby avoiding the necessity of having a special type of rim for each of the different felly constructions and fittings.

At the present time there is a large number of different constructions of demountable rim receiving wheels upon the market and in general use, although a special type of rim is necessary for use in connection with each of the different wheel constructions. The accessory jobber and dealer is thus confronted with the necessity of carrying at all times an immense stock of all of the different sizes of each of the various types of rims, in order to supply individual motorists with the proper sizes and types of rims adapted to fit the wheels upon their particular vehicles. A large amount of capital is tied up at all times in this large stock of rims, and among the objects of this invention is to overcome this difficulty by the provision of a specially constructed rim which is adapted to be used interchangeably upon a number of different wheel constructions. This lifts a heavy burden from the shoulders of the accessory dealer, and at the same time a rim is supplied to the motoring public which has a strong and durable construction, and is not liable to become warped or bent out of shape.

With the above and other objects in view, the invention consists in a certain peculiar construction of the rim, as will more fully appear as the description proceeds, the novel features thereof being pointed out in the appended claims.

For a full understanding of the invention reference is to be had to the following description and accompanying drawings, in which:

Figure 1 is a transverse sectional view through a wheel felly of that type which is provided with a wedge ring showing one of the new interchangeable rims mounted in position thereon.

Figure 2 is a similar view showing the rim as mounted upon an all steel felly and held in position thereon by a conventional locking lug.

Corresponding and like parts are referred to in the following description, and indicated in all of the views of the drawing by like reference characters.

Referring to the drawings, which show the improved rim as mounted upon two different and distinct types of wheels, the rim itself is indicated as a unit by the letter A. The rim is provided with the usual base 1 and side flanges 2, and may have the proper shape and cross section to receive any standard or conventional form of tire. The felly engaging side of the base 1 is provided at opposite sides thereof with the annular enlargements or ribs 3 and 4, respectively, said ribs having the outer faces thereof suitably beveled or inclined, as indicated at $3^a$ and $4^a$, and the rib 3 also having an inwardly facing beveled portion $3^b$. A third annular rib 5 is arranged between the two ribs 3 and 4, being preferably located at a point adjacent to the rib 4 and being formed with an outwardly inclined beveled face $5^a$. The three inwardly projecting peripheral ribs 3, 4 and 5 serve to reinforce and stiffen the rim, so that it has a rigid construction and is not liable to be warped or distorted out of shape.

In Figure 1 of the drawings the rim is shown as applied to a wheel formed with a wooden felly 6 surrounded by a felly band 7, said felly band having an outstanding beveled rib $7^a$ at one edge thereof and correspondingly beveled face $7^b$ at the opposite edge thereof. The rim A is slipped over the wheel from that side thereof which is provided with the beveled edge $7^b$, with the result that the rib 3 of the rim engages the rib $7^a$ of the felly band. The removable wedge ring may then be inserted in position with the inclined faces thereof engaging the beveled edge $7^b$ of the felly band 7 and the inclined face $5^a$ of the rib 5, respectively. The wedge ring 8 is held in position by means of locking lugs 9 applied to lug bolts 10 which are applied to the felly at intervals and extending transversely through the same. Nuts 11 are threaded upon the projecting ends of the lug bolts 10 and engage the locking lugs to force them into operative position. The adjacent face of the felly 6 is shown as provided with a plate 12 against which the inner ends of the locking lugs 9 bear. The felly and mountings thereon are all of a well known construction and no claim to novelty is based thereon, although this construction of wheel ordinarily requires a special type of rim. It will be obvious, however, that the present rim can be applied interchangeably to this and other types of wheels.

In Figure 2 of the drawings the rim is shown as applied to a wheel which is provided with an all metal felly 13, said felly having a channel shaped cross section and the sides thereof being provided at their outer edges with the correspondingly beveled bearing faces 13ª. In order to apply the rim to this felly it is reversed so that the interior rib 4 thereof is the first to slip over the felly. The beveled face 4ª of this rib 4 engages one of the seats 13ª of the felly, while the beveled face 3ᵇ of the rib 3 engages the other seat 13ª of the felly. The outer edge of the rim is then engaged by locking lugs 14 which are applied to the lug bolts 15 and forced tightly in position by the nuts 16. The inner ends of the locking lugs 14 may engage shoulders 17 which are conveniently formed by cutting out ears from the base of the felly and pressing them inwardly, as indicated on the drawing. The felly and locking means are themselves of a well known and conventional construction so that no claim to novelty is based thereon. This form of wheel felly, however, ordinarily requires a special form of rim, although the present rim can be applied with equal facility to this and also to other types of wheels, as has been set forth. The use of this improved rim construction will enable the accessory jobber and dealer to supply all of the reasonable demands of the trade while carrying only a fraction of the stock of rims which is necessary where each type of rim will only fit one particular type of wheel. The rib 3 of the rim is preferably slightly higher than the ribs 4 and 5 which are located at the opposite side of the rim and the arrangement and formation of these ribs is such as to specifically admit engagement of certain beveled faces thereof with the corresponding seats of the different wheel fellies upon which the rim may be placed.

From the foregoing, the advantages of this interchangeable rim construction will be apparent but it is preferable to note that by virtue of the arrangement and construction of the three ribs, so called, designated 3, 4 and 5, the rim is made applicable to those types of rim or felly constructions wherein a locking-ring is employed in which construction the rib 4 acts as a retainer for the said locking ring. Thus the rim and the ring seated in this position may be applied to or removed from the wheel as a unit. Such an arrangement is extremely advantageous as compared with the operation of applying corresponding parts in the conventional form of wheel constructions where the locking ring does not cooperate with the rim in such a manner as to be applied with the rim as above described. On the other hand, the use of this same rim with those types of wheels not requiring the locking-ring necessitates for its application merely the reversal of the rim from that above mentioned, which reversal brings the proper bearing faces into coacting relation to the bearing faces of the felly. Thus it will be seen that the rib 4 has a dual function in the various applications of my special form of rim construction.

It will be understood that the rim may be applied to other forms and types of wheels and fellies and that it is not restricted to use upon the two particular types of wheels which have been selected for illustrative purposes. One embodiment of the invention has been described and illustrated in detail in order to give a clear understanding of the inventive idea, although it will be obvious that numerous modifications and changes are possible in the details of construction without departing from the spirit of the invention.

Having thus described my invention what I claim as new and desire to secure by Letters Patent is,

1. A demountable rim provided upon its inner periphery with a plurality of annular ribs, each of the ribs being formed with a beveled bearing surface and one of the ribs being formed with an additional reversely inclined bearing surface, the rib with the two bearing surfaces being of a greater height than the other ribs, and different selected combinations of the bearing surfaces being adapted to be used in seating the rim upon different types of wheels.

2. A demountable rim provided upon the inner periphery thereof with three annular ribs, two of the ribs being located toward one side of the rim and being each provided with a bearing surface, while the third rib is located toward the other side of the rim and is provided with two bearing surfaces, different selected combinations of the bearing surfaces being adapted to be used in seating the rim upon different types of wheels.

3. A demountable rim provided upon its inner periphery with three annular ribs, two of the ribs being located toward one side of the rim and each provided with a beveled bearing surface, while the third ribs is located toward the opposite side of the rim, and provided with a pair of reversely inclined beveled bearing surfaces, different selected combinations of the bearing surfaces being adapted to be used in seating the rim upon different types of wheels.

4. A demountable rim provided upon its inner periphery with three annular ribs, two of which are located toward one side of the rim, and each provided with a beveled bearing surface, while the third rib is located toward the opposite side of the rim and provided with a pair of reversely inclined beveled bearing surfaces, the third rib having a greater height than the other ribs, different selected combinations of the bearing surfaces being adapted to be used in seating the rim upon different types of wheels.

5. A demountable rim provided upon one side of its inner periphery with a pair of beveled bearing surfaces inclined in the same direction, and provided at the opposite side of its inner periphery with a pair of reversely inclined beveled bearing surfaces, different selected combinations of the bearing surfaces being adapted to be used in seating the rim upon different types of wheels.

6. An interchangeable demountable rim of the class described provided upon its inner periphery with a plurality of projections having bearing surfaces, certain of said surfaces being adapted to seat upon one type of wheel when the rim is applied in one direction and certain others being adapted to seat upon a different type of wheel when the rim is applied in the reverse direction to that aforesaid.

7. A reversible demountable rim having on its inner periphery spaced ribs formed with bearing faces arranged to coact with fellies of different types and interchangeably applicable thereto by reversal of position of the rim, one of said ribs constituting a wedge-ring retainer for that type of felly with which a wedge-ring is employed.

In testimony whereof I affix my signature.

GEORGE STEINGRUBER.